(12) United States Patent
Kim et al.

(10) Patent No.: US 11,663,451 B2
(45) Date of Patent: May 30, 2023

(54) TWO-DIMENSIONAL ARRAY-BASED NEUROMORPHIC PROCESSOR AND IMPLEMENTING METHOD

(71) Applicant: Samsung Electronics Co., Ltd., Suwon-si (KR)

(72) Inventors: Sungho Kim, Yongin-si (KR); Cheheung Kim, Yongin-si (KR); Jaeho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1058 days.

(21) Appl. No.: 16/274,547

(22) Filed: Feb. 13, 2019

(65) Prior Publication Data

US 2020/0074284 A1 Mar. 5, 2020

(30) Foreign Application Priority Data

Sep. 3, 2018 (KR) .................. 10-2018-0104731

(51) Int. Cl.
*G06N 3/063* (2023.01)
*G06F 7/523* (2006.01)
*G06F 7/50* (2006.01)

(52) U.S. Cl.
CPC ............ *G06N 3/063* (2013.01); *G06F 7/50* (2013.01); *G06F 7/523* (2013.01); *G06F 2207/4824* (2013.01)

(58) Field of Classification Search
CPC .... G06F 7/50; G06F 7/523; G06F 2207/4824; G06N 3/063
See application file for complete search history.

(56) References Cited

U.S. PATENT DOCUMENTS 5,630,024 A * 5/1997 Aihara ................. G06N 3/0481
706/41
8,515,885 B2   8/2013 Modha
(Continued)

FOREIGN PATENT DOCUMENTS

EP            664516 A2 *  7/1995 ........... G06N 3/0481
KR     2003-0009682 A     2/2003
(Continued)

OTHER PUBLICATIONS

Park, S., et al. "RRAM-based synapse for neuromorphic system with pattern recognition function." 2012 international electron devices meeting. IEEE, 2012: 10.2.1-10.2.4 (Year: 2012).*

(Continued)

*Primary Examiner* — Kamran Afshar
*Assistant Examiner* — Randall K. Baldwin
(74) *Attorney, Agent, or Firm* — NSIP Law

(57) ABSTRACT

A 2D array-based neuromorphic processor includes: axon circuits each being configured to receive a first input corresponding to one bit from among bits indicating n-bit activation; first direction lines extending in a first direction from the axon circuits; second direction lines intersecting the first direction lines; synapse circuits disposed at intersections of the first direction lines and the second direction lines, and each being configured to store a second input corresponding to one bit from among bits indicating an m-bit weight and to output operation values of the first input and the second input; and neuron circuits connected to the second direction lines, each of the neuron circuits being configured to receive an operation value output from at least one of the synapse circuits, based on time information assigned individually to the synapse circuits, and to perform a multi-bit operation by using the operation values and the time information.

21 Claims, 11 Drawing Sheets

(56) References Cited

U.S. PATENT DOCUMENTS

| | | | |
|---|---|---|---|
| 8,843,425 B2 | 9/2014 | Modha | |
| 8,868,477 B2 | 10/2014 | Esser et al. | |
| 8,977,578 B1* | 3/2015 | Cruz-Albrecht | G06N 3/04 |
| | | | 706/12 |
| 9,104,974 B2 | 8/2015 | Sim et al. | |
| 9,418,333 B2 | 8/2016 | Kim et al. | |
| 9,818,058 B2 | 11/2017 | Arthur et al. | |
| 2011/0004579 A1* | 1/2011 | Snider | G06N 3/049 |
| | | | 706/26 |
| 2013/0132314 A1* | 5/2013 | Snider | G11C 11/54 |
| | | | 706/15 |
| 2014/0032464 A1* | 1/2014 | Esser | G06N 3/04 |
| | | | 706/26 |
| 2014/0032465 A1* | 1/2014 | Modha | G06N 3/04 |
| | | | 706/27 |
| 2014/0188771 A1* | 7/2014 | Modha | G06N 3/04 |
| | | | 706/26 |
| 2015/0058268 A1* | 2/2015 | Modha | G06N 3/063 |
| | | | 706/27 |
| 2015/0106311 A1* | 4/2015 | Birdwell | G06N 3/08 |
| | | | 706/26 |
| 2015/0262057 A1* | 9/2015 | Modha | G06N 3/063 |
| | | | 706/29 |
| 2016/0260008 A1* | 9/2016 | Arthur | G06N 3/063 |
| 2017/0011006 A1 | 1/2017 | Saber et al. | |
| 2017/0193364 A1 | 7/2017 | Lee | |
| 2018/0095930 A1 | 4/2018 | Lu et al. | |
| 2018/0101935 A1* | 4/2018 | Andreopoulos | G06T 1/20 |
| 2019/0325291 A1* | 10/2019 | Gokmen | G06N 3/0454 |

FOREIGN PATENT DOCUMENTS

| | | |
|---|---|---|
| KR | 10-2014-0144130 A | 12/2014 |
| KR | 10-2017-0005562 A | 1/2017 |
| KR | 10-2017-0080428 A | 7/2017 |
| KR | 10-1838560 B1 | 3/2018 |

OTHER PUBLICATIONS

Adhikari, Shyam Prasad, et al. "Memristor bridge synapse-based neural network and its learning." IEEE Transactions on neural networks and learning systems 23.9 (2012): 1426-1435. (Year: 2012).*

Kim, Yongtae, Yong Zhang, and Peng Li. "A digital neuromorphic VLSI architecture with memristor crossbar synaptic array for machine learning." 2012 IEEE International SOC Conference. IEEE, 2012: 328-333 (Year: 2012).*

Cruz-Albrecht, Jose M., Timothy Derosier, and Narayan Srinivasa. "A scalable neural chip with synaptic electronics using CMOS integrated memristors." Nanotechnology 24.38 (2013): 384011: 1-11 (Year: 2013).*

Fan, Deliang, et al. "STT-SNN: Aspin-transfer-torque based soft-limiting non-linear neuron for low-power artificial neural networks." IEEE Transactions on Nanotechnology 14.6 (2015): 1013-1023. (Year: 2015).*

Akopyan, Filipp, et al. "Truenorth: Design and tool flow of a 65 mw 1 million neuron programmable neurosynaptic chip." IEEE transactions on computer-aided design of integrated circuits and systems 34.10 (2015): 1537-1557. (Year: 2015).*

Esser, S., et al. "Convolutional networks for fast, energy-efficient neuromorphic computing. arXiv 2016." arXiv preprint arXiv: 1603. 08270: 1-7 (Year: 2016).*

Sze, Vivienne, et al. "Efficient processing of deep neural networks: A tutorial and survey." Proceedings of the IEEE 105.12 (2017): 2295-2329. (Year: 2017).*

Smith, Michael R., et al. "A novel digital neuromorphic architecture efficiently facilitating complex synaptic response functions applied to liquid state machines." 2017 International Joint Conference on Neural Networks (IJCNN). IEEE, 2017: 2421-2428 (Year: 2017).*

Mittal, Sparsh. "A survey of ReRAM-based architectures for processing-in-memory and neural networks." Machine learning and knowledge extraction 1.1 (2018): 75-114. (Year: 2018).*

Mishra, Asit, et al. "WRPN: Wide Reduced-Precision Networks." International Conference on Learning Representations. Jan. 2018: 1-11 (Year: 2018).*

Kim, Jinseok, et al. "Compact Convolution Mapping on Neuromorphic Hardware using Axonal Delay." Proceedings of the International Symposium on Low Power Electronics and Design. Jul. 2018. (Year: 2018).*

Merolla, Paul A., et al. "A million spiking-neuron integrated circuit with a scalable communication network and interface", Science, vol. 345, Issue 6197, Aug. 8, 2014 (pp. 668-673).

Akopyan, Filipp, et al. "TrueNorth: Design and Tool Flow of a 65 mW 1 Million Neuron Programmable Neurosynaptic Chip", IEEE *Transactions on Computer-Aided Design of Integrated Circuits and Systems*, vol. 34, No. Oct. 10, 10, 2015 (pp. 1537-1557).

Esser, Steven K. et al., "Convolutional Networks for Fast, Energy-Efficient Neuromorphic Computing", arXiv:1603.08270, *PNAS*, vol. 113, No. 41, Oct. 11, 2016 (pp. 11441-11446).

Davies, Mike et al., "Loihi: A Neuromorphic Manycore Processor with On-Chip Learning", *IEEE Micro*, vol. 38, Issue 1 (pp. 82-99), Jan. 2018.

Korean Office Action dated Mar. 16, 2023, in Counterpart Korean Patent Application No. 10-2018-0104731 (6 Pages in English, 7 Pages in Korean).

* cited by examiner $$\begin{array}{r} ABC_2 \\ \times DEF_2 \\ \hline GHI \\ JKL \\ MNO \\ \hline PQRSTU_2 \end{array}$$

— 410
— 420
— 430
— 440
— 450
— 460

Ex) $W = 101_2$, $A = 111_2$ $$\begin{array}{r} 101_2 \\ \times\ 111_2 \\ \hline 101 \\ 101\phantom{0} \\ 101\phantom{00} \\ \hline 100011_2 \end{array}$$

$100011_2$

TWO-DIMENSIONAL ARRAY-BASED NEUROMORPHIC PROCESSOR AND IMPLEMENTING METHOD

CROSS-REFERENCE TO RELATED APPLICATIONS

This application claims the benefit under 35 U.S.C. § 119 of Korean Patent Application No. 10-2018-0104731, filed on Sep. 3, 2018, in the Korean Intellectual Property Office, the entire disclosure of which is incorporated herein by reference for all purposes.

BACKGROUND

1. Field

The following description relates to a two-dimensional array-based neuromorphic processor and an implementing method of a two-dimensional array-based neuromorphic processor.

2. Description of Related Art

Neuromorphic processors are specialized computing hardware processors that may include a neuron circuit and a synapse circuit. As only an example, the neuron circuit may generate activations or processing results, or signals corresponding to such activations or processing results, with respect to other activations or processing results (or corresponding signals) of the neuron circuit, e.g., in a hierarchical manner to generate an overall result. The synapse circuit may be configured to provide connections between nodes or processing devices (e.g., processing units) of the neuron circuit. Such a neuromorphic processor may be used to drive or implement various neural networks such as convolutional neural networks (CNNs), recurrent neural networks (RNNs), and/or feedforward neural networks (FNNs), as non-limiting examples, and such as in fields of data classification or image recognition, also as non-limiting examples.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a two-dimensional (2D) array-based neuromorphic processor includes: axon circuits, each of the axon circuits being configured to receive a first input corresponding to one bit from among bits of an n-bit activation; first direction lines extending in a first direction from the axon circuits; second direction lines intersecting the first direction lines; synapse circuits disposed at intersections of the first direction lines and the second direction lines, each of the synapse circuits being configured to store a second input corresponding to one bit from among bits indicating an m-bit weight and to output operation values of the first input and the second input; and neuron circuits connected to the second direction lines, each of the neuron circuits being configured to receive an operation value output from at least one of the synapse circuits, based on time information assigned individually to the synapse circuits, and to perform a multi-bit operation by using the operation values and the time information, wherein n and m are natural numbers.

The multi-bit operation may indicate a multiplication operation in which at least one of a plurality of operands includes a plurality of bits. A first operand of the multi-bit operation may be the m-bit weight and each second input that is input to at least some of the second direction lines may correspond to a bit among a plurality of bits indicating the first operand.

A second operand of the multi-bit operation may be the n-bit activation and each first input received by at least some of the axon circuits may correspond to a bit among a plurality of bits indicating the second operand.

Synapse circuits, among the synapse circuits, provided on a same line among the first direction lines may be assigned with same time information. Synapse circuits, among the synapse circuits, provided on different lines among the first direction lines may be assigned with different time information.

Each of the neuron circuits may include a single adder. The single adder may be configured to calculate one of a plurality of bits indicating a result value of the multi-bit operation by performing an addition operation using, as an input, any one or any combination of any two or more of a pre-set initial value, operation values received from at least one of the synapse circuits, and a carry value received from another adder.

Either one or both of an addition value and a carry value that are output from the single adder may correspond to one of the plurality of bits indicating the result value of the multi-bit operation.

A time at which the single adder performs the addition operation may be determined based on time information corresponding to each of the operation values received from at least one of the synapse circuits.

The single adder may be configured to be reused to calculate another one of the plurality of bits indicating the result value of the multi-bit operation after calculating the one of the plurality of bits indicating the result value of the multi-bit operation.

The operation values of the first input and the second input may be obtained via AND operations of the first input and the second input.

The neuron circuits may be configured to output a spike in response to a result value of the multi-bit operation being equal to or greater than a threshold value.

In another general aspect, a method of operating a two-dimensional (2D) array-based neuromorphic processor includes: receiving, via each of axon circuits, a first input corresponding to one bit from among bits of an n-bit activation; obtaining an operation value of the first input and a second input, the second input corresponding to one bit among bits indicating an m-bit weight and stored in each of synapse circuits disposed at intersections of first direction lines extending in a first direction from the axon circuits and second direction lines intersecting the first direction lines; and performing a multi-bit operation based on the obtained operation value and time information assigned individually to the synapse circuits, by using neuron circuits connected to the second direction lines, wherein n and m are natural numbers.

The multi-bit operation may indicate a multiplication operation in which at least one of a plurality of operands includes a plurality of bits. A first operand of the multi-bit operation may be the m-bit weight, and each second input that is input to at least some of the second direction lines may correspond to a bit among a plurality of bits indicating the first operand.

A second operand of the multi-bit operation may be the n-bit activation, and each first input received by at least some of the axon circuits may correspond to a bit among a plurality of bits indicating the second operand.

The method may further include: assigning synapse circuits, among the synapse circuits, provided on a same line among the first direction lines with same time information; and assigning synapse circuits, among the synapse circuits, provided on different lines among the first direction lines with different time information.

The performing of the multi-bit operation may include: performing an addition operation by inputting, to a single adder included in each of the plurality of neuron circuits, any one or any combination of any two or more of a pre-set initial value, operation values received from at least one of the synapse circuits, and a carry value received from another adder; and obtaining one of a plurality of bits indicating a result value of the multi-bit operation, based on a result of the addition operation.

The method may further include determining either one or both of an addition value and a carry value that are output from the single adder to be one of the plurality of bits indicating the result value of the multi-bit operation.

The method may further include determining a time at which the single adder performs the addition operation, based on time information corresponding to each of the operation values received from at least one of the synapse circuits.

The method may further include reusing the single adder to calculate another one of the plurality of bits indicating the result value of the multi-bit operation after calculating the one of the plurality of bits indicating the result value of the multi-bit operation by using the single adder.

The obtaining of the operation values may be performed via AND operations of the first input and the second input.

The method may further include outputting a spike in response to a result value of the multi-bit operation being equal to or greater than a threshold value.

In another general aspect, a non-transitory computer-readable storage medium may store instructions that, when executed by the neuromorphic processor or another processor, cause the neuromorphic processor to perform the method described above.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
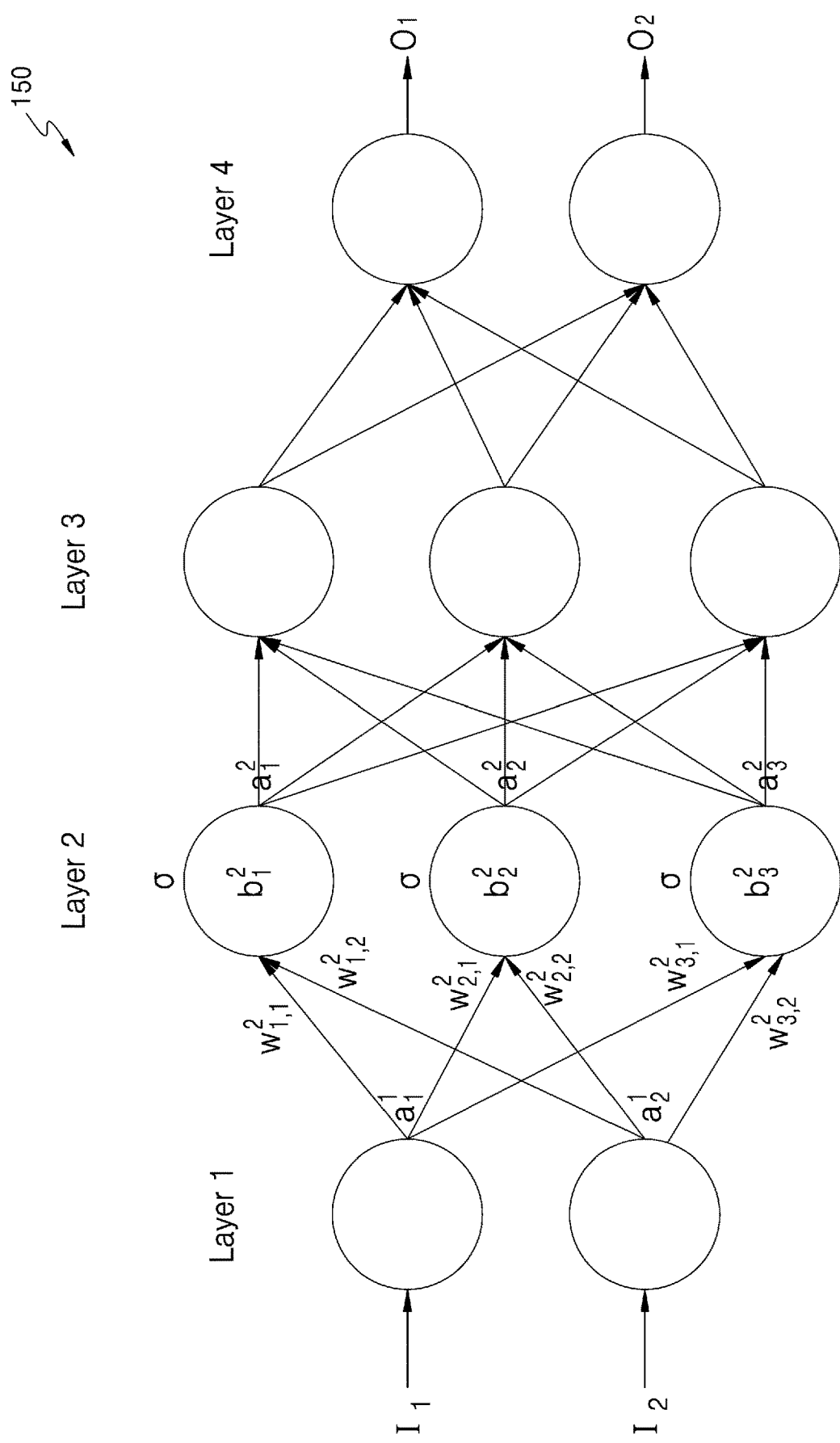
FIG. 1 is a diagram of an example configuration of an artificial neural network.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Unless otherwise defined, all terms, including technical and scientific terms, used herein have the same meaning as commonly understood by one of ordinary skill in the art to which this disclosure of this application pertains in the context of and based on an understanding of this disclosure of this application. Terms, such as those defined in commonly used technical dictionaries, are to be interpreted as having a meaning that is consistent with their meaning in the context of the relevant art that is consistent with the disclosure of this application, and are not to be interpreted in an idealized or overly formal sense unless expressly so defined herein.

In the specification, when a region is "connected" to another region, the regions may not only be "directly connected", but may also be "electrically connected" via another device therebetween. Also, when a part "includes" or "comprises" an element, unless there is a particular description contrary thereto, the part may further include other elements, not excluding the other elements.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

As used herein, the term "and/or" includes any and all combinations of one or more of the associated listed items. Expressions such as "at least one of," when preceding a list of elements, modify the entire list of elements and do not modify the individual elements of the list.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram of an example configuration of an artificial neural network 150.

Referring to FIG. 1, the artificial neural network 150 includes an input layer, hidden layers, and an output layer. The artificial neural network 150 may perform an operation based on received input data (for example, $I_1$ and $I_2$, and generate output data (for example, $O_1$ and $O_2$) based on a result of performing the operation.

The artificial neural network 150 may be a deep neural network (DNN) or an n-layer neural network including at least two hidden layers. For example, as shown in FIG. 1, the artificial neural network 150 may be a DNN including an input layer (Layer1), two hidden layers (Layer2 and Layer3), and an output layer (Layer4). The DNN may include a convolutional neural network (CNN), a recurrent neural network (RNN), a feedforward neural network (FNN), a deep belief network, a restricted Boltzmann machine, or the like, but is not limited to these examples. Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Meanwhile, in FIG. 1, the artificial neural network 150 includes four layers, but this is only an example, and the artificial neural network 150 may include more or less than four layers. Also, the artificial neural network 150 may include layers of another structure different from FIG. 1.

Each layer included in the artificial neural network 150 may include a plurality of artificial neurons each hereinafter referred to as a "neuron", a "node", a "processing element (PE)", a "unit", or a similar term. Herein, with respect to examples and descriptions of FIGS. 1-12, as well as remaining example embodiments, the Summary, and the claims, the use of the term "neuron" is not meant to mean that the "neuron" has any other meaning beyond a technological meaning, i.e., it is not meant to mean that that the term "neuron" hereinafter is structurally and operatively the same or analogous in hardware and hardware implementation with respect to chemical and neurological neuron implementations. Similarly, with the terms "neuron circuit", "synapse", "synapse circuit", "axon", or "axon circuit" with respect to examples and descriptions of FIGS. 1-12, as well as remaining example embodiments, the Summary, and the claims, the use of the term "neuron", "synapse", "axon", or "axon circuit" is not meant to mean that the "neuron", "synapse", "axon", or "axon circuit" have any other meaning beyond a technological meaning, i.e., it is not meant to mean that that the term "neuron", "synapse", "axon", or "axon circuit" hereinafter is structurally and operatively the same or analogous in hardware and hardware implementation with respect to chemical and neurological neuron implementations. For example, the artificial neural network 150 may be hardware that is configured to have multiple layers of hardware nodes, i.e., referred as such "neurons" below, as shown in FIG. 1, where Layer1 may include two neurons (nodes) and Layer2 may include three neurons (nodes). However, this is only an example and each layer included in the artificial neural network 150 may include any number of neurons (nodes).

Thus, these neurons included in each layer of the artificial neural network 150 may be connected to each other and exchange data. For example, one neuron may receive and operate data from other neurons of a previous layer, and output an operation result to other neurons of a subsequent layer.

An output value of each neuron may be referred to as activation. The activation may be an output value of one neuron and an input value of neurons included in a subsequent layer. Meanwhile, each neuron may determine an activation value based on activations received from neurons included in a previous layer and weights for the respective activations and for that activation value. A weight is a parameter used to calculate activation of each neuron, and may also be understood to be a value assigned for a connection relationship between neurons, e.g., between a neuron of one layer and a neuron of a subsequent layer. Such weights may be stored in a memory or buffer between respective neurons, in such neurons, or available for receipt of a request from a neuron and provision of the corresponding weight to the neuron, as non-limiting examples.

Each of these neurons may be a hardware computational unit, i.e., a computational element or processor, outputting activation upon receiving an input, and may map an input and an output. For example, when σ denotes an activation function, $w_{jk}^i$ denotes a weight for a connection relationship between a $k^{th}$ neuron included in an $(i-1)^{th}$ layer and a $j^{th}$ neuron included in an $i^{th}$ layer, $b_j^i$ denotes a bias of the $j^{th}$ neuron included in the $i^{th}$ layer, and $a_j^i$ denotes activation of the $j^{th}$ neuron included in the $i^{th}$ layer, activation $a_j^i$ may be calculated according to Equation 1.

$$a_j^i = \sigma\left(\sum_k (w_{jk}^i \times a_k^{i-1}) + b_j^i\right) \qquad [\text{Equation 1}]$$

As such, an operation of an artificial neural network may include a multiplication operation in which an output value of a neuron of a previous layer and a weight of a synapse are multiplied, and an addition operation in which a receiving neuron adds result values of multiplication operations.

Figure 2:
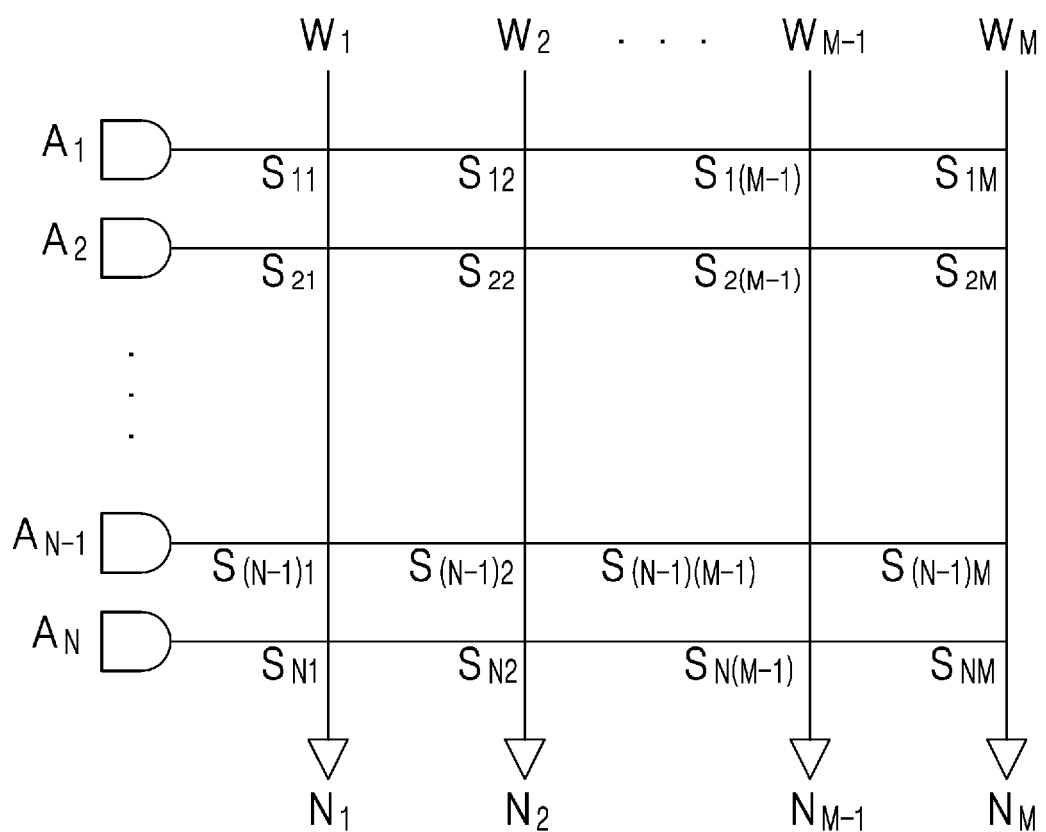
FIG. 2 is a diagram of an example configuration of a neuromorphic processor.

FIG. 2 is a diagram of an example configuration of a neuromorphic processor 200.

Referring to FIG. 2, the neuromorphic processor 200 is, for example, a 2-dimensional (2D) array-based neuromorphic processor for efficiently performing a multiplication operation among essential operations of the artificial neural network 150 described with reference to FIG. 1. The neuromorphic processor 200 includes N axon circuits $A_1$ through $A_N$, wherein N is an arbitrary natural number, M neuron circuits $N_1$ through $N_M$, wherein M is an arbitrary natural number, and N×M synapse circuits $S_{11}$ through $S_{NM}$. Also, the neuromorphic processor 200 may include first direction lines extending from the axon circuits $A_1$ through $A_N$ in a first direction and second direction lines extending from the neuron circuits $N_1$ through $N_M$ in a second direction. The first direction lines and the second direction lines may intersect each other, and the synapse circuits $S_{11}$ through $S_{NM}$ may be provided at intersections of the first direction lines and the second direction lines.

Referring to FIG. 2, the first direction is a row direction and the second direction is a column direction, but the first and second directions are not limited to those shown. The neuromorphic processor may have a 2D array structure in which the first direction is a column direction and the second direction is a row direction. Also, FIG. 2 illustrates only components of the neuromorphic processor 200 related to the described embodiment. Thus, one skilled in the art would understand that the neuromorphic processor 200 may further include other general-purpose components in addition to the components shown in FIG. 2. For example, the neuromorphic processor 200 may also be representative of a controller and a memory, e.g., in addition to the axon circuits, neuron circuits, and synapse circuits.

The represented controller performs overall functions to control the neuromorphic processor 200. The controller may be an array of a plurality of logic gates or may be a combination of a general-purpose micro-processor and a memory in which a program executable by the micro-processor is stored, as non-limiting examples.

The represented memory is hardware storing weight information used in the neuromorphic processor, variable values of the axon circuits $A_1$ through $A_N$ and neuron circuits $N_1$ through $N_M$, and intermediate processing data of the neuron circuits $N_1$ through $N_M$, and for example, the memory may store data processed or to be processed by the neuron circuits $N_1$ through $N_M$ in the neuromorphic processor. The memory may be a static RAM (SRAM), but is not limited thereto. The memory may include either one or both of a volatile memory and a nonvolatile memory. Examples of the nonvolatile memory include read-only memory (ROM) programmable ROM (PROM), electrically programmable ROM (EPROM), electrically erasable and programmable ROM (EEPROM), a flash memory, phase-change RAM (PRAM), magnetic RAM (MRAM), resistive RAM (RRAM), ferroelectric RAM (FRAM), etc. Examples of the volatile memory include dynamic RAM (DRAM), synchronous DRAM (SDRAM), phase-change RAM (PRAM), magnetic RAM (MRAM), resistive RAM (RRAM), ferroelectric RAM (FeRAM), etc.

Each of the axon circuits A1 through AN may be a circuit configured to transmit signals from the neuron to another neuron, and each of the axon circuits A1 through AN may be configured to receive a first input corresponding to one bit among bits of an n-bit activation (n is an arbitrary natural number) and configured to transmit the first input to a first direction line. The activation may be an electric signal input to the axon circuits A1 through AN. Since the first input corresponds to one bit among the bits indicating the n-bit activation, the first input may have a binary value. For example, the first input may include 1-bit information corresponding to a logic value 0 or 1. However, the first input is not limited to the foregoing example, and may have a value corresponding to a multi-bit. Each of the axon circuits A1 through AN may include a memory, buffer, or register storing input information.

Each of the synapse circuits $S_{11}$ through $S_{NM}$ may store a weight corresponding to connection strength of connection relationships between neurons. Each of the synapse circuits $S_{11}$ through $S_{NM}$ may include a memory for storing a weight or may be connected to a memory storing a weight. Meanwhile, a value stored in each of the synapse circuits $S_{11}$ through $S_{NM}$ may be dynamically adjusted. For example, each of the synapse circuits $S_{11}$ through $S_{NM}$ may be configured to store a second input received through a respective second direction line. For example, the second input may correspond to one bit among bits indicating an m-bit weight (m is an arbitrary natural number). Since the second input corresponds to one of the bits indicating the m-bit weight, the second input may have a binary value. However, the second input is not limited to a binary value and may have a value corresponding to a multi-bit.

Each of the synapse circuits $S_{11}$ through $S_{NM}$ may receive the first input transmitted from an axon circuit through a corresponding first direction line or may output an operation value of the first input and the second input stored therein or received from a memory. For example, the operation value of the first input and the second input may be a multiplication value of the first input and the second input. When the second input is multiplied by the first input, the size or strength of a signal transmitted from the axon circuits $A_1$ through $A_N$ to the neuron circuits $N_1$ through $N_M$ may be adjusted. As such, an operation of adjusting the size or strength of a signal transmitted to a next neuron according to connection strength between neurons may be implemented using the synapse circuits $S_{11}$ through $S_{NM}$.

When the first and second inputs both have a binary value, the multiplication value of the first and second inputs may be obtained via an AND operation of the first and second inputs. Each of the synapse circuits $S_{11}$ through $S_{NM}$ may include an AND gate for performing an AND operation. However, the operation value of the first and second inputs is not limited to being the multiplication value of the first and second inputs. The operation value of the first and second inputs may be a value obtained via a suitable arbitrary operation for simulating the strength or size of activation adjusted according to connection strength between neurons.

Each of the neuron circuits $N_1$ through $N_M$ may receive operation values of the first input and the second input through a respective second direction line. Each of the neuron circuits $N_1$ through $N_M$ may determine whether to output a spike based on the operation values received through the respective second direction line. For example, each of the neuron circuits $N_1$ through $N_M$ may output a spike when an accumulated value of the received operation values is equal to or greater than a pre-set threshold value. The spike output from the neuron circuits $N_1$ through $N_M$ may correspond to activation input to axon circuits of a next stage.

The neuron circuits $N_1$ through $N_M$ are located at the rear end based on the synapse circuits $S_{11}$ through $S_{NM}$, and thus may be referred to as post-synaptic neuron circuits, and the axon circuits $A_1$ through $A_N$ are located at the front end of based on the synapse circuits $S_{11}$ through $S_{NM}$, and thus may be referred to as pre-synaptic neuron circuits.

Figure 3:
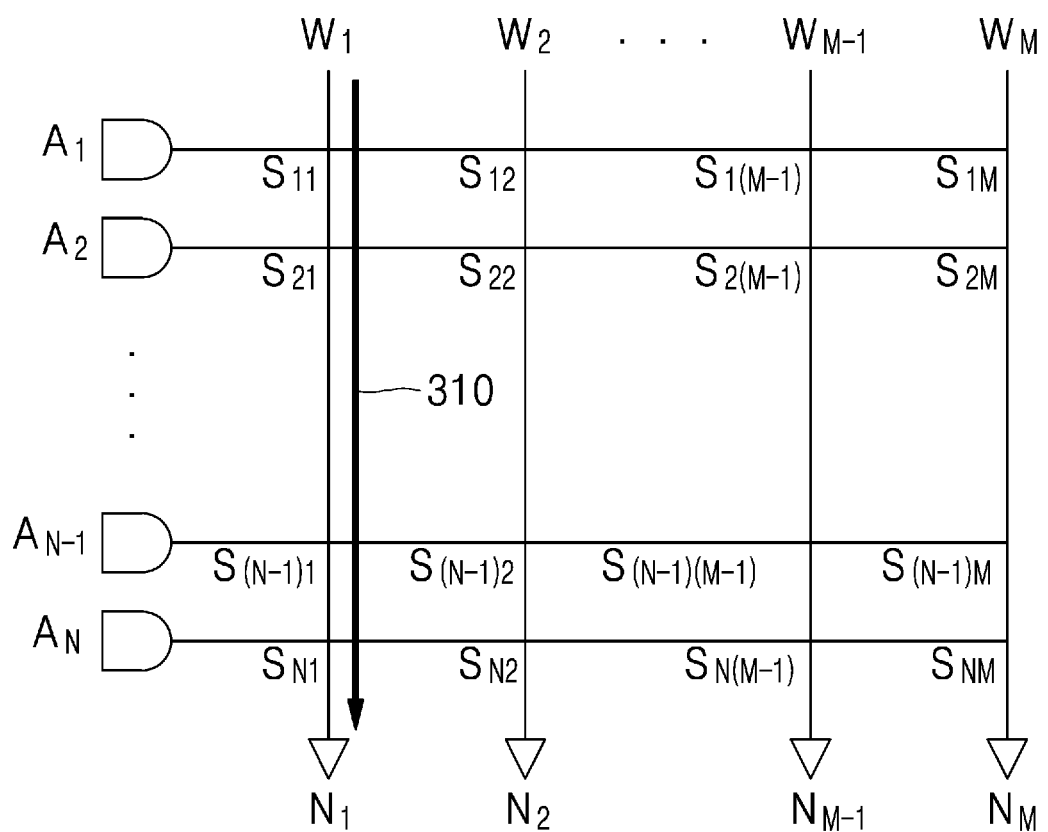
FIG. 3 is a diagram for describing an operating method of a neuromorphic processor, according to the related art.

FIG. 3 is a diagram for describing an example operating method of a general neuromorphic processor according to the related art.

A general 2D array-based neuromorphic processor and the 2D array-based neuromorphic processor 200, according to various embodiments, have different structures and operate in different manners.

For example, the general 2D array-based neuromorphic processor of the related art calculates an entire array at once by using a current summation method. For example, in the general 2D array-based neuromorphic processor of the related art, currents flowing in a column direction 310 through the synapse circuits $S_{11}$, $S_{21}$, and so on to $S_{N1}$ by activation transmitted from the axon circuits $A_1$ through $A_N$ are added to produce an added current and a spike is output when the size or strength of the added current is equal to or greater than a pre-set threshold value. In this case, a quick operation is possible but in order to use the current summation method, peripheral circuits, such as an analog-to-digital converter (ADC) and a digital-to-analog (DAC) converter, are required, and the power consumption and areas of the peripheral circuits are large.

As for another example, the general 2D array-based neuromorphic processor of the related art performs an operation according to neurons (for example, according to columns in FIG. 3) by using a time-division method instead of the current summation method. For example, operation values are sequentially input in the column direction 310 from the synapse circuits $S_{11}$, $S_{21}$, and so on to $S_{N1}$ with respect to one neuron circuit $N_1$, and addition or integration is performed on the received operation values by using a bit-counting operation method. Then, an operation with respect to each of subsequent neuron circuits $N_2$ through $N_M$ is sequentially performed. In this case, since the activation input to the axon circuits $A_1$ through $A_N$ and the weight stored in the synapse circuits $S_{11}$ through $S_{NM}$ all have a binary value, a multi-bit operation is not possible. Accordingly, an image/time-series information process is performed in 1-bit resolution and the accuracy of the image/time-series information process is low. In order to avoid such issues, a multi-bit weight may be used, but a plurality of SRAMs are used to realize a multi-bit weight, and thus the area of an entire circuit is increased. A memory, such as ReRAM, PCM, or the like, may be used instead of SRAM.

The 2D array-based neuromorphic processor 200, according to various examples, may overcome such issues of the general 2D array-based neuromorphic processor of the related art described above. For example, the 2D array-based neuromorphic processor 200 has a neuron circuit structure and uses an operation method, in which a multi-bit operation is possible even by using only 1-bit resolution. Accordingly, image/time-series information may be processed with high accuracy without requiring peripheral circuits such as an ADC and DAC. Also, in examples, a trade-off between a network size (for example, the number of neurons included in a network) and resolution may be dynamically adjusted according to the operation method. Hereinafter, example processes of the 2D array-based neuromorphic processor 200, according to various examples, performing a multi-bit operation will be described with reference to FIGS. 4 through 10.

Figures 4, 5:
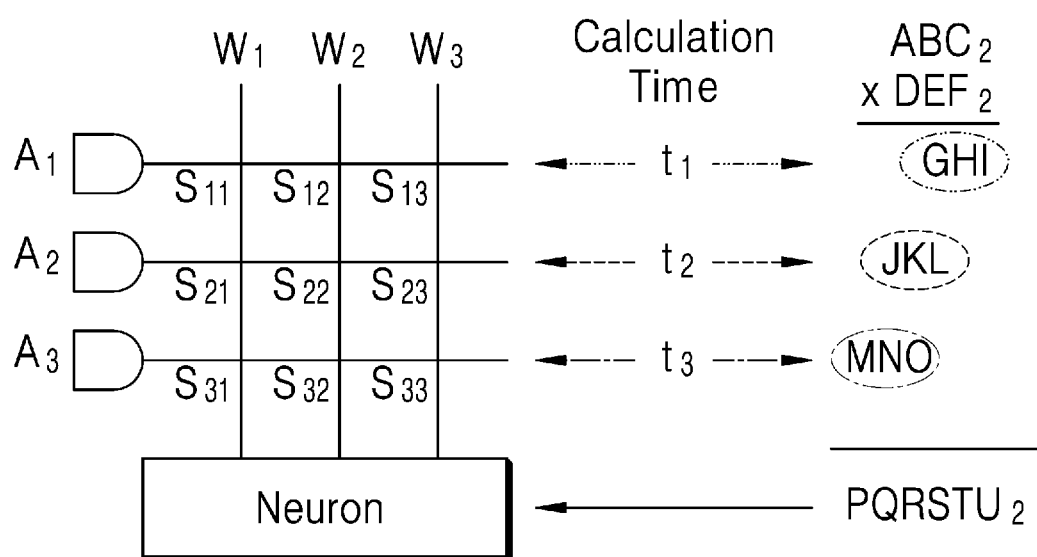
FIG. 4 is a diagram of an example operation process of 3-bit binary multiplication.
FIG. 5 is a diagram for describing an example method, performed by a neuromorphic processor, of performing a multi-bit multiplication operation.

FIG. 4 is a diagram of an example operation process of 3-bit binary multiplication.

Referring to FIG. 4, a multiplication operation process between 3-bit binary values is illustrated as an example of a multi-bit multiplication operation. The multi-bit multiplication operation indicates a multiplication operation in which at least one of operands includes a plurality of bits. When a first operand 410 of the multi-bit multiplication operation is $ABC_2$ that is a 3-bit binary value and a second operand 420 is $DEF_2$ that is a 3-bit binary value, a multiplication operation of the first and second operands 410 and 420 may be performed by calculating multiplication values according to bits and then adding the calculated multiplication values in accordance with digits.

For example, GHI that is a first multiplication value 430 is obtained by multiplying the first operand 410 and F that is a lowest bit (i.e., a least significant bit) of the second operand 420, JKL that is a second multiplication value 440 is obtained by multiplying the first operand 410 and E that is a second lowest bit of the second operand 420, and MNO that is a third multiplication value 450 is obtained by multiplying the first operand 410 and D that is a third lowest bit (i.e., a highest bit or a most significant bit) of the second operand 420, and then $PQRSTU_2$ that is a final multiplication result value 460 of the first and second operands 410 and 420 may be obtained by adding the obtained first through third multiplication values 430 through 450 in accordance with digits. Hereinafter, a method, performed by a 2D array-based neuromorphic processor according to an embodiment, of performing a multi-bit multiplication operation by using the operation process of the multi-bit multiplication operation described above will be described.

FIG. 5 is a diagram for describing an example method, performed by a neuromorphic processor 200-1, of performing a multi-bit multiplication operation.

Referring to FIG. 5, the neuromorphic processor 200-1 according to an embodiment has a 3×3 matrix structure. The neuromorphic processor of FIG. 5 includes the axon circuits $A_1$, $A_2$, and $A_3$, the synapse circuits $S_{11}$ through $S_{33}$, and a neuron circuit. FIG. 5 illustrates an example in which the neuromorphic processor has a 3×3 matrix structure for convenience of description, but an embodiment is not limited thereto. Also, FIG. 5 illustrates a method of performing a multiplication operation between 3-bit binary values by using the neuromorphic processor 200-1 having a 3×3 matrix structure, but one skilled in the art would understand that the neuromorphic processor 200-1 having a 3×3 matrix structure may be used to perform a multiplication operation between a 1-bit binary value and a 3-bit binary value, a multiplication operation between a 2-bit binary value and a 2-bit binary value, etc.

In order to perform the multi-bit multiplication operation shown in FIG. 4, the neuromorphic processor 200-1 may match second inputs input to second direction lines $W_1$, $W_2$, and $W_3$ respectively to bits indicating a first operand of the multi-bit multiplication operation. For example, the second input input to the second direction line $W_1$ may correspond to C among bits indicating ABC that is the first operand, the second input input to the second direction line $W_2$ may correspond to B among the bits indicating ABC that is the first operand, and the second input input to the second direction line $W_3$ may correspond to A among the bits indicating ABC that is the first operand. In this example, the first operand may correspond to a 3-bit weight.

Also, in order to perform the multi-bit multiplication operation shown in FIG. 4, the neuromorphic processor 200-1 may match first inputs input to the axon circuits $A_1$, $A_2$, and $A_3$ respectively to bits indicating a second operand of the multi-bit multiplication operation. For example, the first input input to the axon circuit $A_1$ may correspond to F among bits indicating DEF that is the second operand, the first input input to the axon circuit $A_2$ may correspond to E among the bits indicating DEF that is the second operand, and the first input input to the axon circuit $A_3$ may correspond to D among the bits indicating DEF that is the second operand. In this example, the second operand may correspond to 3-bit activation.

Even when the first input input to each of the axon circuits $A_1$, $A_2$, and $A_3$ and the second input stored in each of the synapse circuits $S_{11}$ through $S_{33}$ all have 1-bit resolution, the neuromorphic processor according to an embodiment may perform the multi-bit multiplication operation between the first operand and the second operand by matching the second inputs input to the second direction lines $W_1$, $W_2$, and $W_3$, respectively, to the bits indicating the first operand of the multi-bit multiplication operation and matching the first inputs input to the axon circuits $A_1$, $A_2$, and $A_3$ respectively to the bits indicating the second operand of the multi-bit multiplication operation. Accordingly, a multi-bit multiplication operation between the 3-bit activation and the 3-bit weight may be performed.

A time-division method may be applied while the neuromorphic processor 200-1 performs the multi-bit multiplication operation between the first operand and the second operand. The time-division method may be a method in which a signal is temporally divided and processed. For example, the neuromorphic processor 200-1 may calculate GHI that is a first multiplication value via a bitwise AND operation of the first input input to the axon circuit $A_1$ and each of the second inputs stored in the synapse circuits $S_{11}$, $S_{12}$, and $S_{13}$ at a time $t_1$.

For example, at the time $t_1$, the neuromorphic processor 200-1 may calculate I among the bits indicating the first multiplication value via the bit AND operation of the first input input to the axon circuit $A_1$ and the second input stored in the synapse circuit $S_{11}$, calculate H among the bits indicating the first multiplication value via the bit AND operation of the first input input to the axon circuit $A_1$ and the second input stored in the synapse circuit $S_{12}$, and calculate G among the bits indicating the first multiplication value via the bit AND operation of the first input input to the axon circuit $A_1$ and the second input stored in the synapse circuit $S_{13}$.

In the same manner, the neuromorphic processor 200-1 may calculate JKL that is a second multiplication value via a bit AND operation of the first input input to the axon circuit $A_2$ and each of the second inputs stored in the synapse circuits $S_{21}$, $S_{22}$, and $S_{23}$ at a time $t_2$, and calculate MNO that is a third multiplication value via a bit AND operation of the first input input to the axon circuit $A_3$ and each of the second inputs stored in the synapse circuits $S_{31}$, $S_{32}$, and $S_{33}$ at a time $t_3$.

As such, the neuromorphic processor 200-1 may perform an operation in row-by-row instead of in general column-by-column. A neuron circuit included in the neuromorphic processor 200-1 may receive a bit AND operation value based on time information assigned individually for the synapse circuits $S_{11}$ through $S_{33}$, and output a final multiplication result value by performing only bit addition.

For example, the neuron circuit may receive the bit AND operation values I, H, and G respectively from the synapse circuits $S_{11}$, $S_{12}$, and $S_{13}$ at the time $t_1$, receive the bit AND operation values L, K, and J respectively from the synapse circuits $S_{21}$, $S_{22}$, and $S_{23}$ at the time t2, and receive the bit AND operation values O, N, and M respectively from the synapse circuits $S_{31}$, $S_{32}$, and $S_{33}$ at the time $t_3$. Also, the neuron circuit may obtain PQRSTU that is a final multiplication result value by adding the received GHI, JKL, and MNO in accordance with digits. As such, since the neuromorphic processor 200-1 does not require a complex circuit such as a multiplier and performs a multi-bit multiplication operation by only using a bit AND operation and a bit addition operation, circuit implementation is facilitated.

However, FIG. 5 is only an example, and a method of assigning the second inputs input to the second direction lines $W_1$, $W_2$, and $W_3$, respectively, to the bits indicating the first operand of the multi-bit multiplication operation or a method of assigning the first inputs input to the axon circuits $A_1$, $A_2$, and $A_3$, respectively, to the bits indicating the second operand of the multi-bit multiplication operation may be different from that described with reference to FIG. 5. For example, the bits indicating the second operand may be respectively assigned to the second inputs input to the second direction lines $W_1$, $W_2$, and $W_3$ or the bits indicating the first operand may be respectively assigned to the first inputs input to the axon circuits $A_1$, $A_2$, and $A_3$. Also, an order of assigning the bits indicating the first operand or the second operand respectively to the second inputs or first inputs may be changed.

Also, in FIG. 5, synapse circuits arranged on the same line among first direction lines are assigned with same time information while synapse circuits arranged on different lines among the first direction lines are assigned with different time information, but an embodiment is not limited thereto. For example, each of synapse circuits may be assigned with different time information. However, in order to increase an operation speed via minimal time-division, the method of FIG. 5 may be used.

The time $t_1$, the time $t_2$, and the time $t_3$ may be different times. For example, the time $t_2$ may be a time delayed by a pre-set time from the time $t_1$ and the time $t_3$ may be a time delayed by a pre-set time from the time $t_2$. However, the disclosure is not limited to the foregoing example of times $t_1$, $t_2$, and $t_3$.

Also, throughout the specification, the time $t_1$, $t_2$, or $t_3$ is not intended to be restricted to a specific moment, but is intended to indicate timing or a time period in which a related operation is performed. Thus, one skilled in the art would understand that operations described to be performed at a certain time in the specification are not necessarily performed simultaneously.

Figure 6:
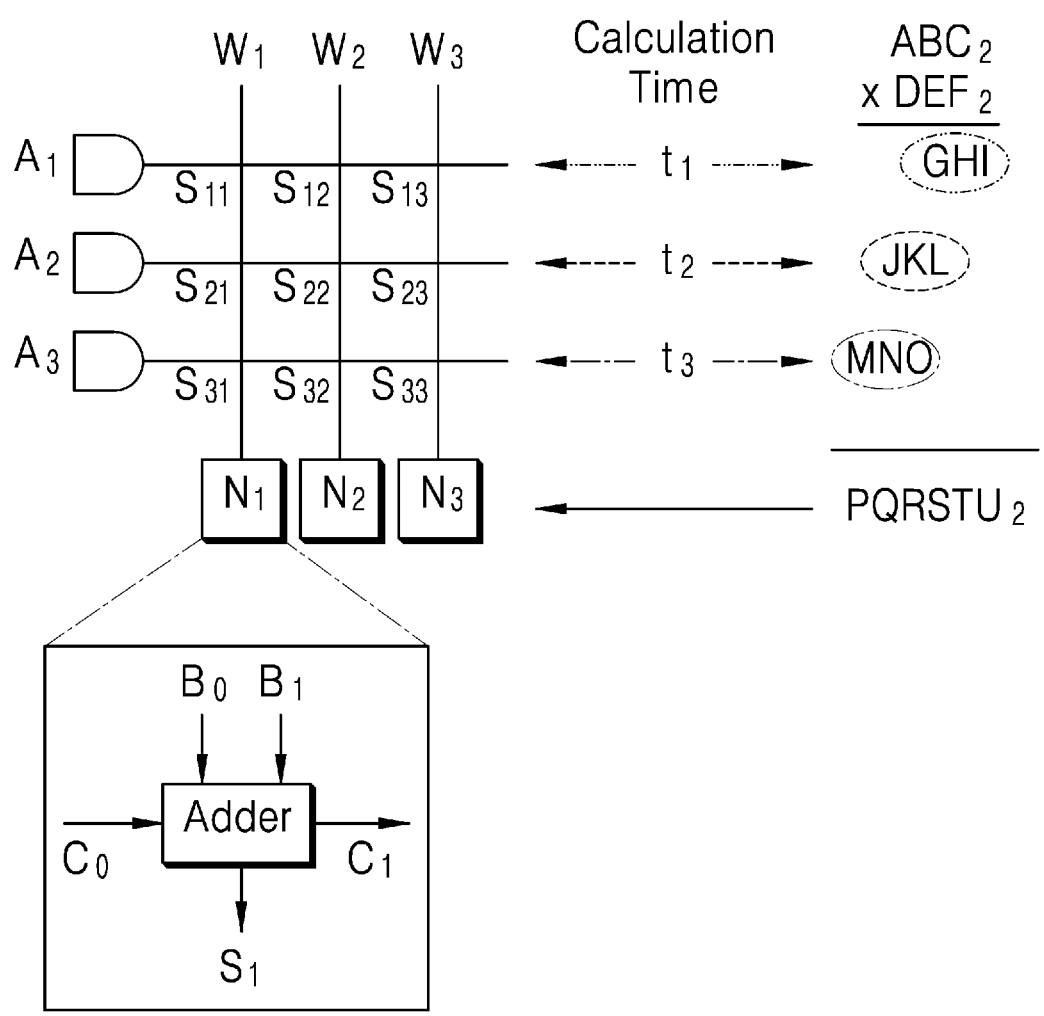
FIG. 6 is a diagram of example neuron circuits.

FIG. 6 is a diagram of example neuron circuits $N_1$, $N_2$, and $N_3$.

Referring to FIG. 6, the neuromorphic processor 200-1 includes a plurality of the neuron circuits $N_1$, $N_2$, and $N_3$. Each of the neuron circuits $N_1$, $N_2$, and $N_3$ may receive an operation value output from at least one of the synapse circuits $S_{11}$ through $S_{33}$ based on time information individually assigned for the synapse circuits $S_{11}$ through $S_{33}$, and perform a multi-bit multiplication operation by using the received operation value and the time information.

Each of the neuron circuits $N_1$, $N_2$, and $N_3$ may include a single adder. The single adder may be a combination circuit having three inputs of an augend $B_0$, an addend $B_1$, and a carry digit $C_0$ from another digit position (i.e., a previous carry value), and two outputs of a non-carry sum $S_1$ and a new carry digit $C_1$. The single adder may calculate one of bits indicating a result value of a multi-bit multiplication operation by performing an addition operation using, as an input, any one or any combination of any two or more of a pre-set initial value, operation values received from at least one of synapse circuits, and a carry value received from another adder.

For example, either one or both of an addition value and a carry value output from the single adder may correspond to one of the bits indicating the result value of the multi-bit multiplication operation. The single adder may be reused to calculate another one of the bits indicating the result value of the multi-bit multiplication operation after the one of the bits indicating the result value of the multi-bit multiplication operation is calculated. A time at which the single adder performs the addition operation may be determined based on time information corresponding to each of the operation values received from at least one of the synapse circuits. Hereinafter, processes of performing a multi-bit multiplication operation by using a single adder included in each of the neuron circuits $N_1$, $N_2$, and $N_3$ will be described with reference to FIG. 7.

Figure 7:
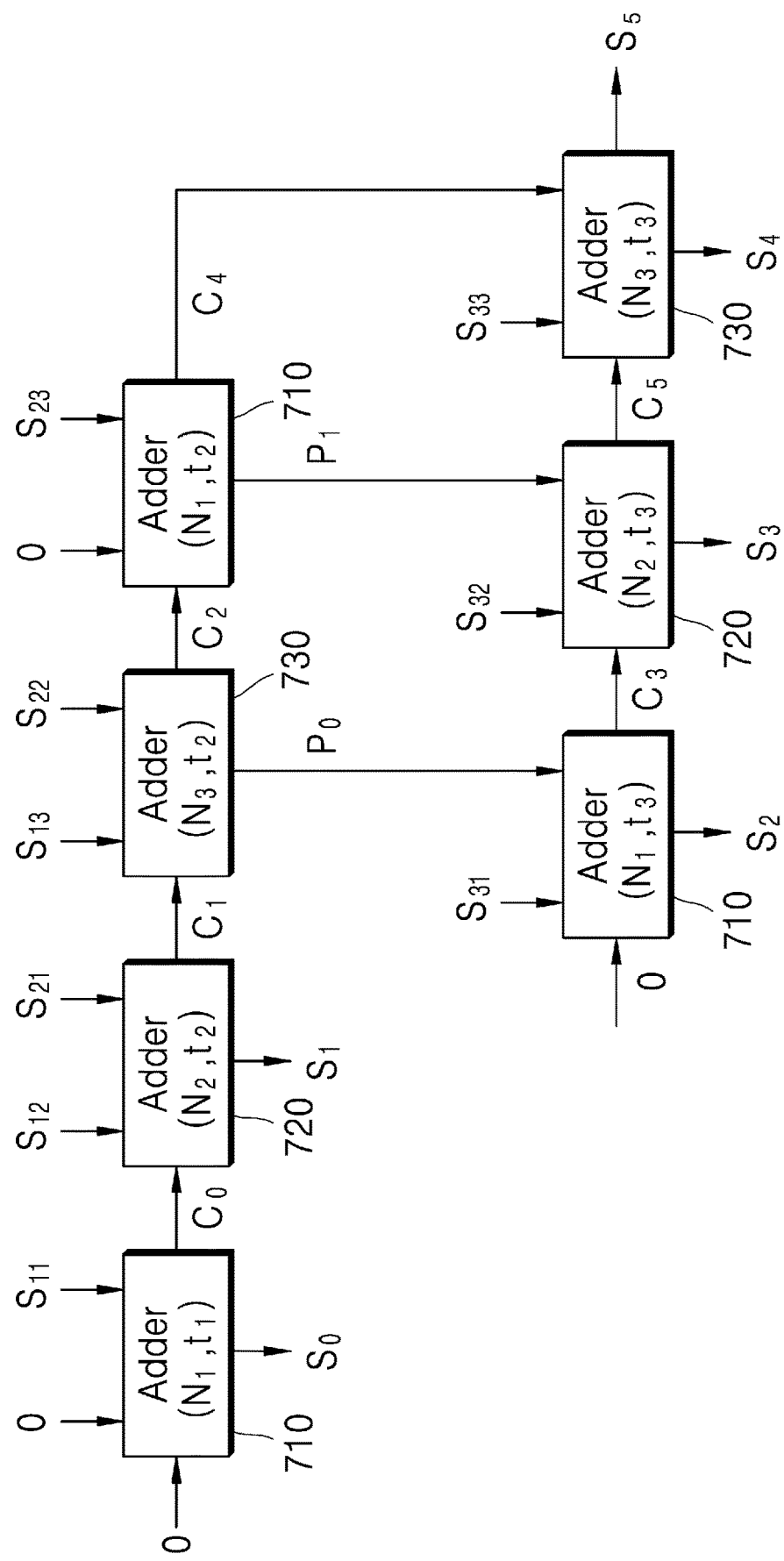
FIG. 7 is a diagram illustrating example processes of performing a multi-bit multiplication operation by using the neuron circuit of FIG. 6.

FIG. 7 is a diagram illustrating example processes of performing a multi-bit multiplication operation by using the neuron circuits $N_1$, $N_2$, and $N_3$ of FIG. 6.

Referring to FIG. 7, processes of performing a multi-bit multiplication operation by using a first adder 710 included in the neuron circuit $N_1$, a second adder 720 included in the neuron circuit $N_2$, and a third adder 730 included in the neuron circuit $N_3$ are illustrated.

The first adder 710 may receive a pre-set initial value 0 as an augend, receive an operation value from the synapse circuit $S_{11}$ at the time $t_1$ as an addend, and receive the pre-set initial value 0 as a previous carry value. The first adder 710 may output an addition value $S_0$ and a carry value $C_0$ by performing an addition operation at the time $t_1$ that is a time when all inputs are received. The output addition value $S_0$ may be determined to be a lowest bit (least significant bit) among bits indicating a result value of the multi-bit multiplication operation. Also, the output carry value $C_0$ may be input as a previous carry value of the second adder 720.

The second adder 720 may receive an operation value from the synapse circuit $S_{12}$ at the time $t_1$ and receive an operation value from the synapse circuit $S_{21}$ at the time $t_2$. The second adder 720 may output an addition value $S_1$ and a carry value $C_1$ by performing an addition operation at the time $t_2$ that is a time when all inputs are received. The output addition value $S_1$ may be determined to be a second lowest bit among the bits indicating the result value of the multi-bit multiplication operation. Also, the output carry value $C_1$ may be input as a previous carry value of the third adder 730.

The third adder 730 may receive an operation value from the synapse circuit $S_{13}$ at the time $t_1$ and receive an operation value from the synapse circuit $S_{22}$ at the time $t_2$. The third adder 730 may output an addition value $P_0$ and a carry value $C_2$ by performing an addition operation at the time $t_2$ that is a time when all inputs are received. The output addition value $P_0$ may be used as an input for performing a subsequent operation by the first adder 710 at the time $t_3$. Also, the output carry value $C_2$ may be input as a previous carry value of the first adder 710 such that the first adder 710 performs a subsequent operation at the time $t_2$.

The first adder 710 may receive the pre-set initial value 0 and receive an operation value from the synapse circuit $S_{23}$ at the time $t_2$. The first adder 710 may output an addition value $P_1$ and a carry value $C_4$ by performing an addition operation when all inputs are received. The output addition value $P_1$ may be used as an input for performing a subsequent operation by the second adder 720 at the time $t_3$, and the output carry value $C_4$ may be input to the third adder 730 for a subsequent operation.

As such, the first adder 710 may be reused to calculate another bit among the bits indicating the result value of the multi-bit multiplication operation after being used to calculate the lowest bit among the bits indicating the result value of the multi-bit multiplication operation at the time $t_1$. Also, as will be described later, the second and third adders 720 and 730 may also be reused. Accordingly, even when each of the neuron circuits $N_1$ through $N_3$ includes only a single adder, the multi-bit multiplication operation may be smoothly performed because the single adder is reused.

According to the embodiments of FIGS. 6 and 7, the size of circuit for realizing the neuromorphic processor according to an embodiment may be reduced.

The first adder 710 may receive the pre-set initial value 0 as a previous carry value and receive an operation value from the synapse circuit $S_{31}$ at the time $t_3$. The first adder 710 may output an addition value $S_2$ and a carry value $C_3$ by performing an addition operation when all inputs are received. The output addition value $S_2$ may be determined to be a third lowest bit among the bits indicating the result value of the multi-bit multiplication operation. Also, the output carry value $C_3$ may be input to the second adder 720 for a subsequent operation.

The second adder 720 may receive an operation value from the synapse circuit $S_{32}$ at the time $t_3$. The second adder 720 may output an addition value $S_3$ and a carry value $C_5$ by performing an addition operation when all inputs are received. The output addition value $S_3$ may be determined to be a fourth lowest bit among the bits indicating the result value of the multi-bit multiplication operation. Also, the output carry value $C_5$ may be input to the third adder 730 for a subsequent operation.

The third adder 730 may receive an operation value from the synapse circuit $S_{33}$ at the time $t_3$. The third adder 730 may output an addition value $S_4$ and a carry value $S_5$ by performing an addition operation when all inputs are received. The output addition value $S_4$ may be determined to be a fifth lowest bit among the bits indicating the result value of the multi-bit multiplication operation. Also, the output carry value $S_5$ may be determined to be a sixth lowest bit, i.e., a highest bit (most significant bit) among the bits indicating the result value of the multi-bit multiplication operation.

The neuromorphic processor 200-1 may calculate $S_5S_4S_3S_2S_1S_0$ that is the result value of the multi-bit multiplication operation by adjusting an operation order and operation time of the first through third adders 710 through 730 included in the neuron circuits $N_1$ through $N_3$. $S_5S_4S_3S_2S_1S_0$ that is the result value of the multi-bit multiplication operation may correspond to a result value of a multiplication operation between 3-bit activation input to the axon circuits $A_1$, $A_2$, and $A_3$ and a 3-bit weight input to the second direction lines $W_1$, $W_2$, and $W_3$.

Figure 8:
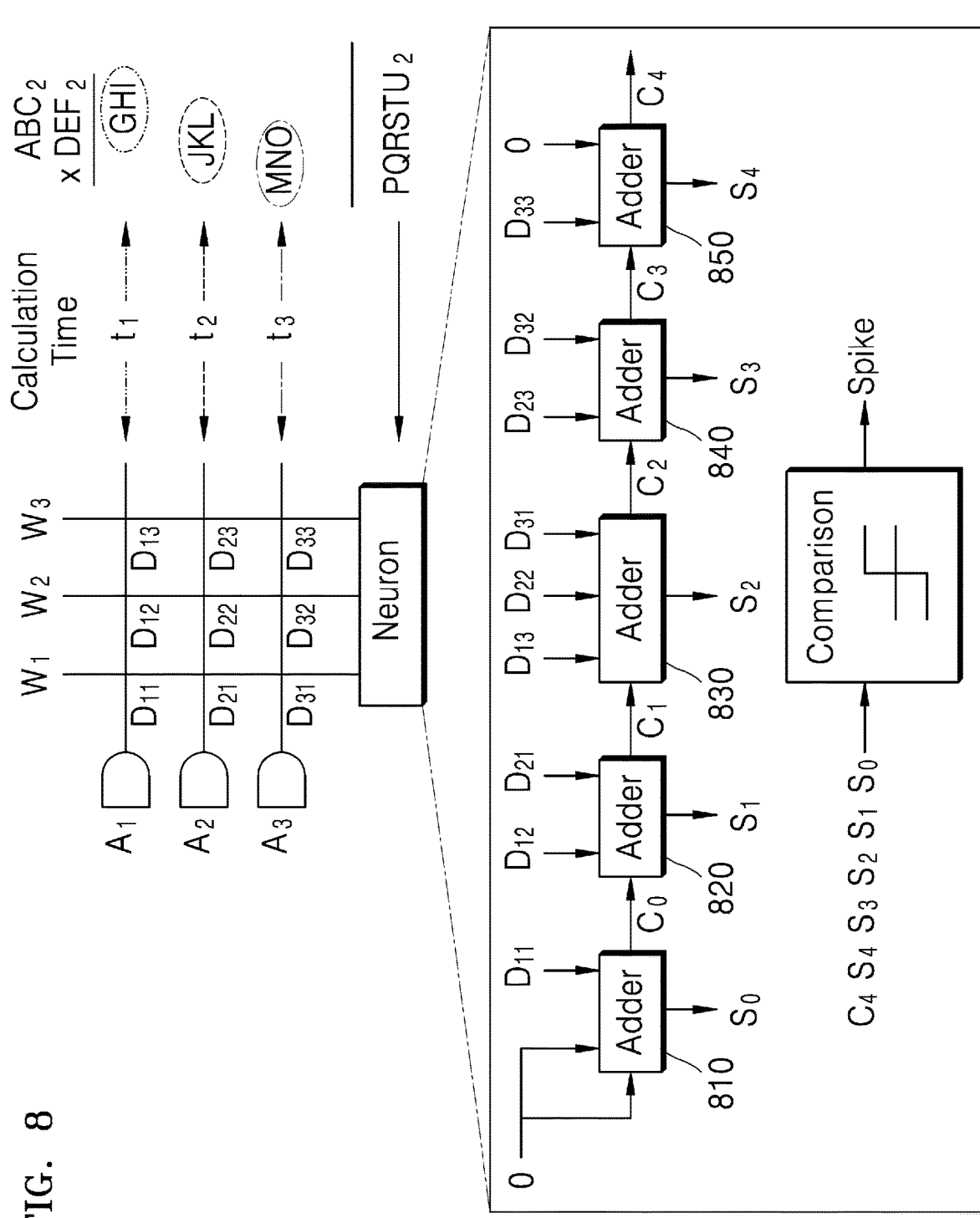
FIG. 8 is a diagram of an example of a neuron circuit.

FIG. 8 is a diagram of an example neuron circuit of a neuromorphic processor 200-2.

Unlike FIG. 7, which illustrated an embodiment in which each neuron circuit of a plurality of neuron circuits includes a single adder, FIG. 8 illustrates an embodiment in which a plurality of neuron circuits correspond to one neuron circuit and the neuron circuit includes five adders, i.e., first through fifth adders 810 through 850.

According to an embodiment, a bitwise AND operation between a first input and a second input is performed, wherein the first input is input to each of the axon circuits $A_1$ through $A_3$ of the neuromorphic processor 200-2 and corresponds to one bit among bits indicating 3-bit activation, and the second input is stored in each of synapse circuits $D_{11}$ through $D_{13}$, $D_{21}$ through $D_{23}$, or $D_{31}$ through $D_{33}$ of the neuromorphic processor 200-2 arranged on a first direction line extending from each of the axon circuits $A_1$ through $A_3$ and corresponds to one bit among bits indicating a 3-bit weight, and time information may be added to an operation value obtained via the bitwise AND operation. The neuron circuit may perform a multi-bit multiplication operation between the 3-bit activation and the 3-bit weight by performing bit addition using the first through fifth adders 810 through 850 based on the operation values and the time information added to each of the operation values.

For example, the first adder 810 included in the neuron circuit may receive 0 as an addend and an initial value of a previous carry value, and receive an operation value and time information of the time $t_1$ from the synapse circuit $D_{11}$. The first adder 810 may output an addition value $S_0$ and a carry value $C_0$ by performing an addition operation when all inputs are received. The output addition value $S_0$ may be determined to be a lowest bit among bits indicating a result value of a multi-bit multiplication operation. Also, the output carry value $C_0$ may be input to the second adder 820 for a subsequent operation.

The second adder 820 may receive an operation value and the time information of the time $t_1$ from the synapse circuit $D_{12}$ and receive an operation value and time information of the time $t_2$ from the synapse circuit $D_{21}$. The second adder 820 may output an addition value $S_1$ and a carry value $C_1$ by performing an addition operation when all inputs are received. The output addition value $S_1$ may be determined to be a second lowest bit among the bits indicating the result value of the multi-bit multiplication operation. Also, the output carry value $C_1$ may be input to the third adder 830 for a subsequent operation.

The third adder 830 may receive an operation value and the time information of the time $t_1$ from the synapse circuit $D_{13}$, receive an operation value and the time information of the time $t_2$ from the synapse circuit $D_{22}$, and receive an operation value and time information of the time $t_3$ from the synapse circuit $D_{31}$. The third adder 830 may output an addition value $S_2$ and a carry value $C_2$ by performing an addition operation when all inputs are received. The output addition value $S_2$ may be determined to be a third lowest bit among the bits indicating the result value of the multi-bit multiplication operation. Also, the output carry value $C_2$ may be input to the fourth adder 840 for a subsequent operation.

The fourth adder 840 may receive an operation value and the time information of the time $t_2$ from the synapse circuit $D_{23}$ and receive an operation value and the time information of the time $t_3$ from the synapse circuit $D_{32}$. The fourth adder 840 may output an addition value $S_3$ and a carry value $C_3$ by performing an addition operation when all inputs are received. The output addition value $S_3$ may be determined to be a fourth lowest bit among the bits indicating the result value of the multi-bit multiplication operation. Also, the output carry value $C_3$ may be input to the fifth adder 850 for a subsequent operation.

The fifth adder 850 may receive a pre-set initial value 0 and receive an operation value and the time information of the time $t_3$ from the synapse circuit $D_{33}$. The fifth adder 850 may output an addition value $S_4$ and a carry value $C_4$ by performing an addition operation when all inputs are received. The output addition value $S_4$ may be determined to be a fifth lowest bit among the bits indicating the result value of the multi-bit multiplication operation. Also, the output carry value $C_4$ may be determined to be a sixth lowest bit, i.e., a highest bit, among the bits indicating the result value of the multi-bit multiplication operation.

Through the above processes, the neuron circuit may calculate $C_4S_4S_3S_2S_1S_0$ that is the result value of the multi-bit multiplication operation and output a spike when the result value of the multi-bit multiplication operation is equal to or greater than a pre-set threshold value.

Figure 9:
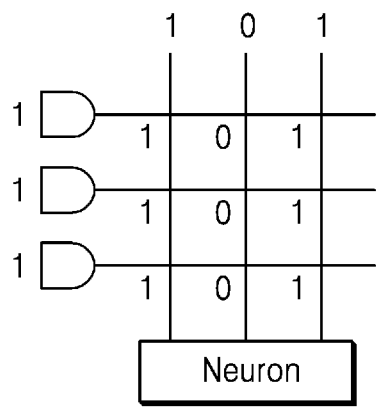
FIG. 9 is a diagram of an example of performing a multi-bit multiplication operation by using the neuron circuit of FIG. 8.
Figure 9:
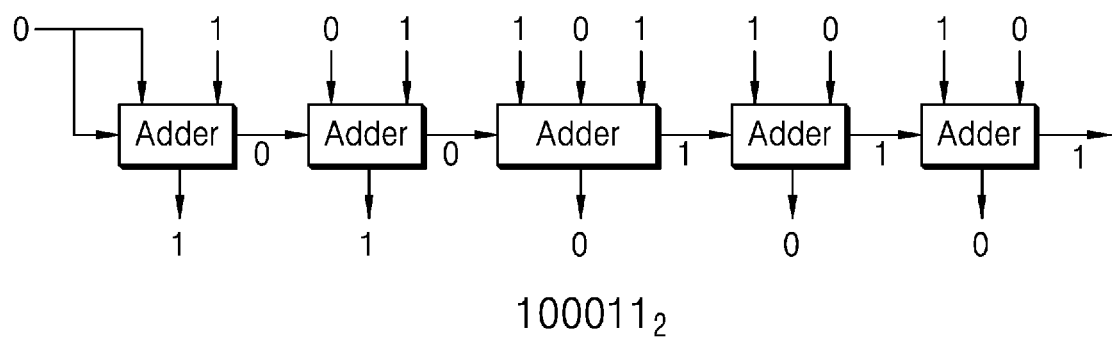

FIG. 9 is a diagram of an example of performing a multi-bit multiplication operation by using the neuron circuit of FIG. 8.

Referring to FIG. 9, $100011_2$ that is a result value of a multi-bit multiplication operation is accurately calculated by using the method described with reference to FIG. 8, when a first operand is $101_2$ that is a 3-bit binary value and a second operand is $111_2$ that is a 3-bit binary value.

Figure 10:
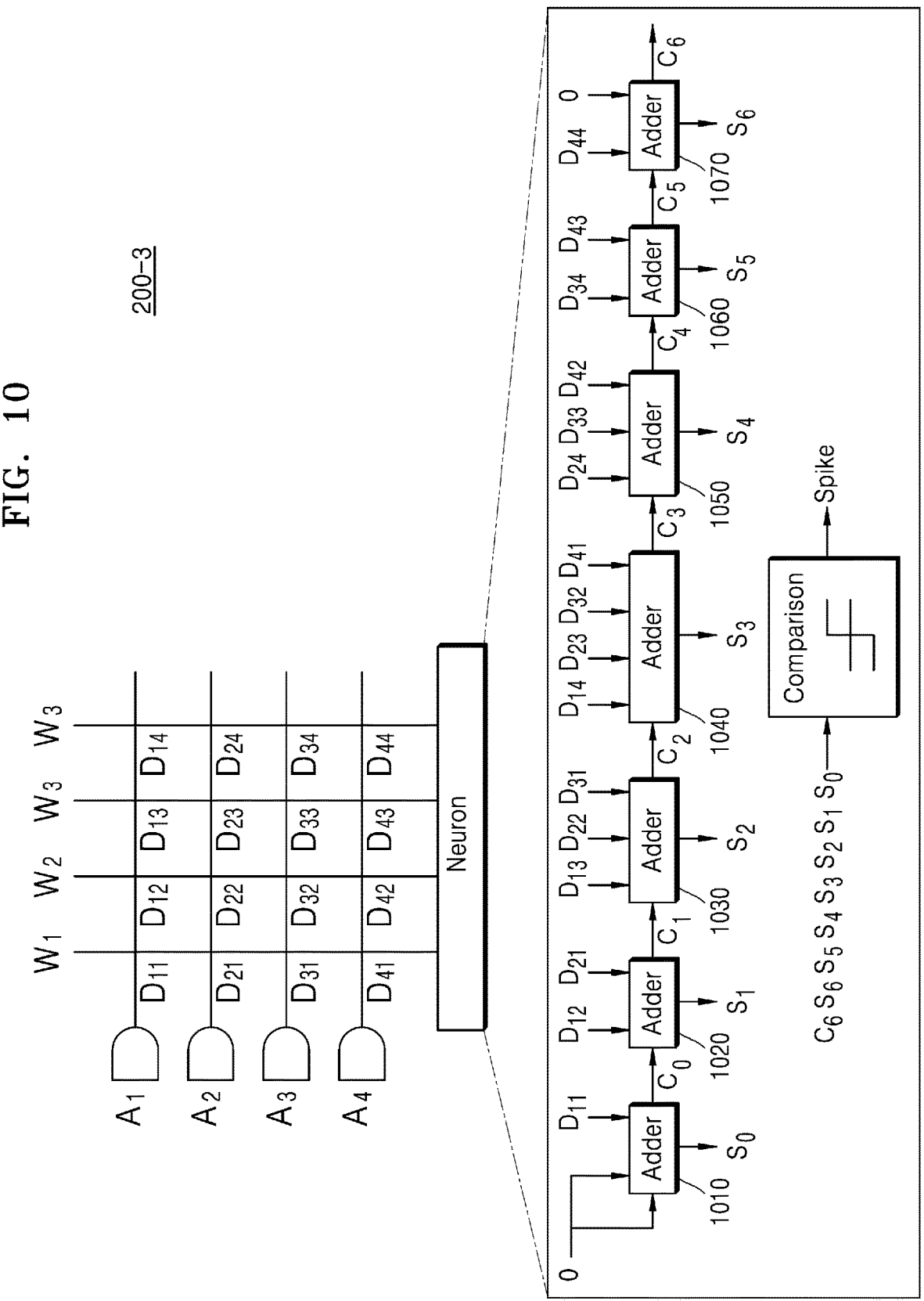
FIG. 10 is a diagram of an example neuron circuit.

FIG. 10 is a diagram of an example neuron circuit 200-3.

Unlike FIG. 8 illustrating an embodiment in which the neuromorphic processor 200-2 has a 3×3 matrix structure, FIG. 10 illustrates an embodiment in which the neuromorphic processor 200-3 has a 4×4 matrix structure. When the neuromorphic processor 200-3 has a 4×4 matrix structure, a neuron circuit may include seven adders 1010 through 1070 to perform 4-bit binary multiplication. One skilled in the art would understand that the neuromorphic processor of FIG. 10 is able to calculate $C_6S_6S_5S_4S_3S_2S_1S_0$ as a result of the 4-bit binary multiplication by using the seven adders 1010 through 1070 by referring to the processes of FIG. 8 described above, and thus overlapping details thereof are omitted.

Referring to FIGS. 8 and 10, one skilled in the art would understand that the multi-bit multiplication operation disclosed herein may be applied even when the neuromorphic processor has a matrix structure other than a 3×3 or 4×4 matrix structure. Also, referring to FIG. 6, one skilled in the art would understand that the multi-bit multiplication operation disclosed herein may be performed regardless of a matrix structure of the neuromorphic processor as long as each of neuron circuits included in the neuromorphic processor includes a single adder.

Figure 11:
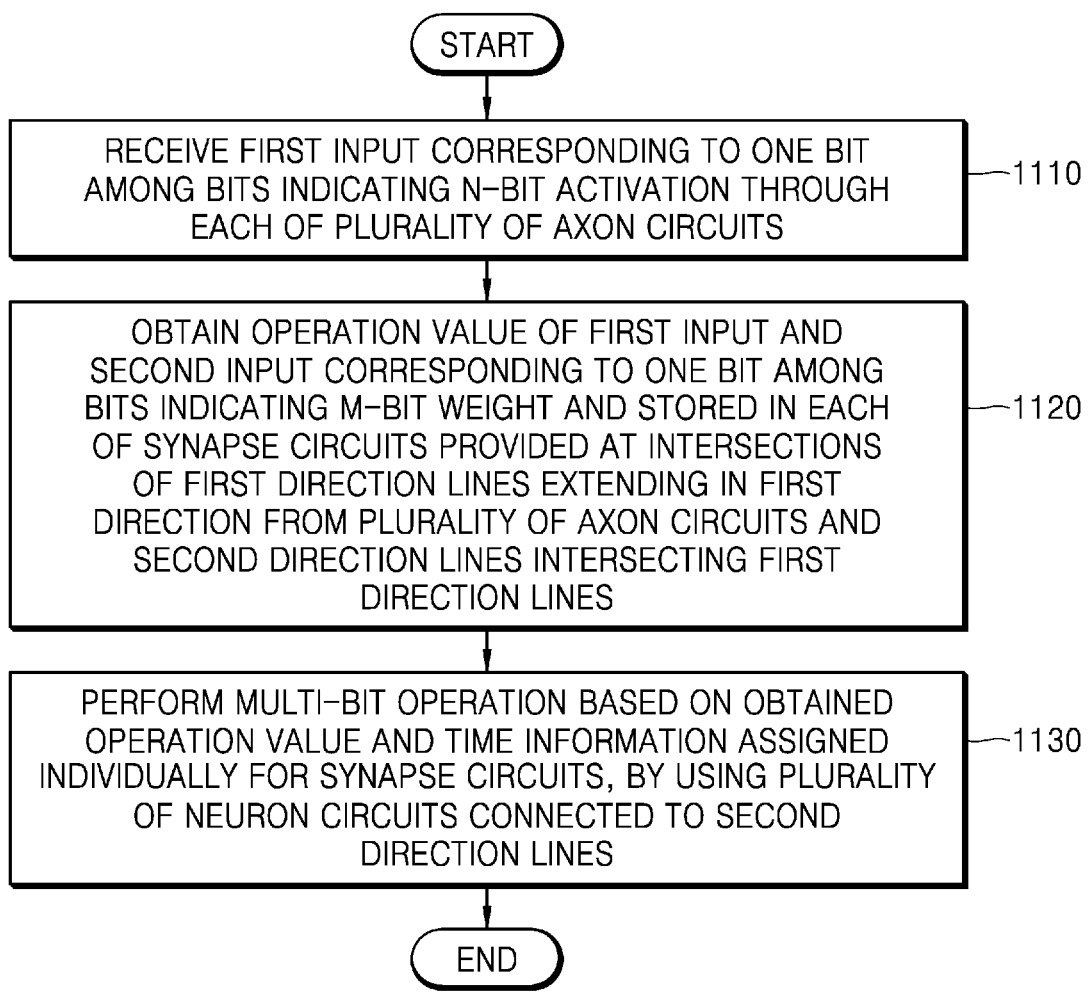
FIG. 11 is a flowchart of an example operating method of a neuromorphic processor.

FIG. 11 is a flowchart of an example operating method of a neuromorphic processor.

Referring to FIG. 11, the operating method of the neuromorphic processor includes operations that are performed by the neuromorphic processors of FIGS. 2 and 5 through 10 in time-series. Thus, details described above with reference to the neuromorphic processors of FIGS. 2 and 5 through 10 may be applied to those of the operating method of FIG. 11 even when omitted.

In operation 1110, the neuromorphic processor may receive a first input corresponding to one bit among bits of an n-bit activation through each of a plurality of axon circuits.

In operation 1120, the neuromorphic processor may obtain an operation value of the first input and a second input corresponding to one bit among bits indicating an m-bit weight and stored in each of synapse circuits provided at intersections of first direction lines extending in a first direction from the plurality of axon circuits and second direction lines intersecting the first direction lines. For example, the neuromorphic processor may obtain the operation value via an AND operation of the first and second inputs.

Also, the neuromorphic processor may receive time information assigned individually for the synapse circuits, together with the operation value from each of the synapse circuits. However, the disclosure is not limited to such an embodiment, and the neuromorphic processor may receive the operation value from each of the synapse circuits at a time assigned individually for the synapse circuits, and use a time at which the operation value is received as time information.

In operation 1130, the neuromorphic processor may perform a multi-bit operation based on the obtained operation value and the time information assigned individually for the synapse circuits, by using a plurality of neuron circuits connected to the second direction lines. The multi-bit operation may indicate a multiplication operation in which at least one of operands includes a plurality of bits.

The first inputs received by the plurality of axon circuits may respectively correspond to bits indicating a second operand (for example, the n-bit activation) of a multi-bit multiplication operation, and the second inputs input according to the second direction lines may respectively correspond to bits indicating a first operand (for example, the m-bit weight) of the multi-bit multiplication operation.

The neuromorphic processor may assign same time information to the synapse circuits arranged on the same line among the first direction lines, and assign different time information to the synapse circuits arranged on different lines among the first direction lines.

The neuromorphic processor may perform an addition operation by inputting, to a single adder included in each of the plurality of neuron circuits, any one or any combination of any two or more of a pre-set initial value, operation values received from at least one of the synapse circuits, and a carry value received from another adder. The neuromorphic processor may obtain one of bits indicating a result of the multi-bit multiplication operation based on a result of the addition operation. For example, the neuromorphic processor may determine either one or both of an addition value and a carry value output from the single adder to be one of the bits indicating the result value of the multi-bit multiplication operation.

The neuromorphic processor may determine a time at which the single adder performs the addition operation based on time information corresponding to each of the operation values received from at least one of the synapse circuits. For example, the neuromorphic processor may determine a time at which the single adder received all inputs to be a time at which the single adder performs the addition operation. Meanwhile, the time at which the single adder received all inputs may be determined based on time information received by the single adder. For example, the time at which the single adder received all inputs may be determined based on latest time information among pieces of time information received by the single adder.

The neuromorphic processor may calculate all bits indicating the result value of the multi-bit multiplication operation by reusing the single adder so as to calculate another bit among the bits indicating the result value of the multi-bit multiplication operation after calculating one bit among the bits indicating the result value of the multi-bit multiplication operation by using the single adder. The neuromorphic processor may output a spike when the result value of the multi-bit multiplication operation is equal to or greater than a pre-set threshold value.

A subject performing the operating method of the neuromorphic processor is the neuromorphic processor, but examples also include the operating method of the neuromorphic processor being performed by an example controller, as noted above, included in the neuromorphic processor or a separate controller located outside the neuromorphic processor.

Figure 12:
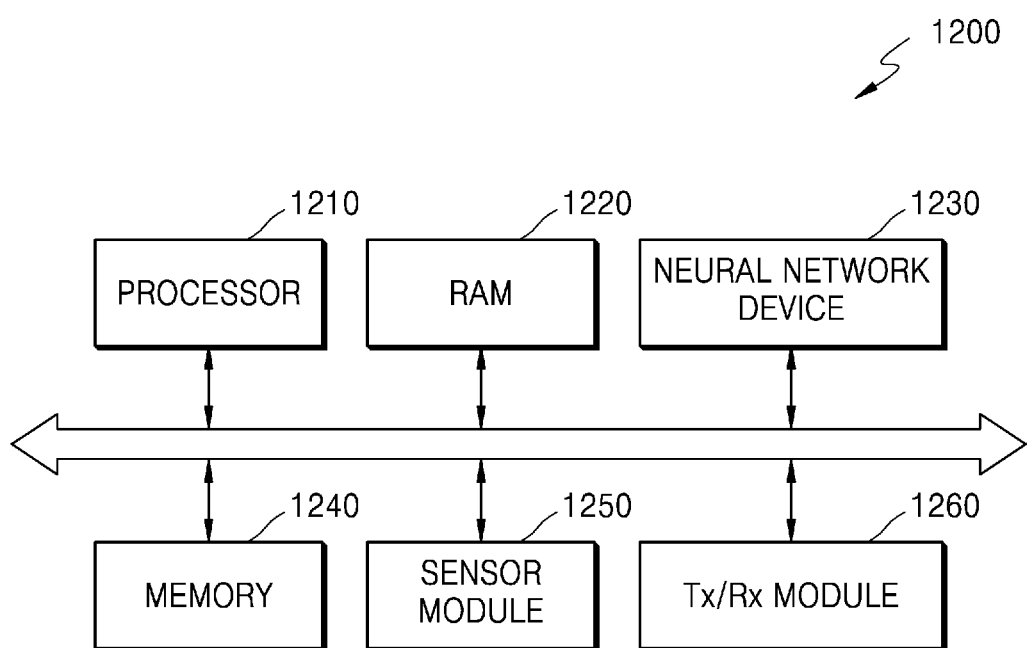
FIG. 12 is a block diagram of an example configuration of an electronic system.

FIG. 12 is a block diagram of a configuration of an example electronic system 1200.

Referring to FIG. 12, the electronic system 1200 may extract valid information by analyzing input data in real-time based on a neural network, and determine a situation based on the extracted valid information or control components of an electronic device on which the electronic system 1200 is mounted. For example, the electronic system 1200 may be applied to a robot apparatus, such as a drone or an advanced driver assistance system (ADAS), a smart TV, a smart phone, a medical device, a mobile device, an image display device, a measuring device, or an IoT device, and may be mounted on at least one of various types of electronic devices.

The electronic system 1200 may include a processor 1210, an RAM 1220, a neural network device 1230, a memory 1240, a sensor module 1250, and a communication (Tx/Rx) module 1260. The electronic system 1200 may further include an input/output module, a security module, a power control device, etc. At least some of hardware components of the electronic system 1200 may be mounted on at least one semiconductor chip.

The processor 1210 controls overall operations of the electronic system 1200. The processor 1210 may include one processor core (single core) or a plurality of processor cores (multi-core). The processor 1210 may process or execute programs and/or data stored in the memory 1240. According to an embodiment, the processor 1210 may execute the programs stored in the memory 1240 to control functions of the neural network device 1230. The processor 1210 may be a central processing unit (CPU), a graphics processing unit (GPU), or an application processor (AP).

The RAM 1220 may temporarily store programs, data, or instructions. For example, the programs and/or data stored in the memory 1240 may be temporarily stored in the RAM 1220 according to control or a booting code of the processor 1210. The RAM 1220 may be a memory, such as DRAM or SRAM. The RAM 1220 may also store the parameters of the neural network, e.g., trained connection weights and biases.

The neural network device 1230 may implement a neural network, e.g., a trained neural network, based on received input data and generate an information signal based on a result of performing the operation. The neural network may include CNN, RNN, FNN, deep belief network, restricted Boltzmann machines, etc., e.g. trained to a predetermined accuracy and/or predetermined maximum inaccuracy for a particular objective, but is not limited thereto. The neural network device 1230 is a neural network-exclusive hardware accelerator or a device including the same, and includes one or more of the neuromorphic processor examples described herein, for example.

The information signal may include one of various types of recognition signals, such as a voice recognition signal, an object recognition signal, an image recognition signal, a biometric information recognition signal, etc. For example, the neural network device 1230 may receive frame data included in a video stream as input data, and generate a recognition signal with respect to an object included in an image indicated by the frame data. However, the disclosure is not limited to the foregoing examples of input data, and the neural network device 1230 may receive any type of input data and generate a recognition signal according to the input data, based on a type or function of an electronic apparatus on which the electronic system 1200 is mounted.

The memory 1240 is a storage space for storing data, and may store an operating system (OS), various programs, and various types of data. According to an embodiment, the memory 1240 may store intermediate results generated while the operation is performed. The memory 1240 may also or alternatively store the neural network.

The memory 1240 may be DRAM, but is not limited thereto. The memory 1240 may include either one or both of a volatile memory and a nonvolatile memory. Examples of the nonvolatile memory include ROM, PROM, EPROM, EEPROM, a flash memory, PRAM, MRAM, RRAM, and FRAM. Examples of the volatile memory include DRAM, SRAM, SDRAM, PRAM, MRAM, RRAM, and FeRAM.

According to an embodiment, the memory 1240 may include any one or any combination of any two or more of HDD, SSD, CF, SD, Micro-SD, Mini-SD, xD, and a memory stick The sensor module 1250 may collect surrounding information of the electronic apparatus on which the electronic system 1200 is mounted. The sensor module 1250 may sense or receive a signal (for example, an image signal, a voice signal, a magnetic signal, a biometric signal, or a touch signal) from outside the electronic apparatus, and convert the sensed or received signal to data. In this regard, the sensor module 1250 may include at least one of various types of sensing devices, such as a microphone, an image pickup device, an image sensor, a light detection and ranging (LIDAR) sensor, an infrared sensor, an ultrasound sensor, a bio-sensor, and a touch sensor.

The sensor module 1250 may provide the converted data to the neural network device 1230 as input data. For example, the sensor module 1250 may include an image sensor, and may generate a video stream by photographing an external environment of the electronic apparatus and sequentially provide consecutive data frames of the video stream to the neural network device 1230 as the input data. However, the disclosure is not limited to the foregoing examples, and the sensor module 1250 may provide various types of data to the neural network device 1230.

The Tx/Rx module 1260 may include various wired or wireless interfaces capable of communicating with an external device. For example, the Tx/Rx module 1260 may include a local area network (LAN), a wireless LAN (WLAN) such as wireless fidelity (Wi-Fi), a wireless personal area network (WPAN) such as Bluetooth, and communication interfaces capable of accessing a mobile cellular network, such as wireless universal serial bus (USB), Zig-Bee, near field communication (NFC), radio-frequency identification (RFID), power line communication (PLC), $3^{rd}$ generation (3G), $4^{th}$ generation (4G), or long-term evolution (LTE).

The neuromorphic processors 200, 200-1, 200-2, and 200-3 in FIGS. 2 and 5 through 10, and the processor 1210, the RAM 1220, the neural network device 1230, the memory 1240, the sensor module 1250, and the Tx/Rx module 1260 in FIG. 12 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 11 that performs the operations described in this application is performed by computing hardware, for example, by one or more processors or computers, implemented as described above executing instructions or software to perform the operations described in this application that are performed by the method. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD–RWs, CD+RWs, DVD-ROMs, DVD–Rs, DVD+Rs, DVD–RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A two-dimensional (2D) array-based neuromorphic processor, comprising:
   axon circuits, each of n axon circuits of the axon circuits being configured to receive a first input corresponding to a respectively differently bit from among bits of an n-bit activation;
   n first direction lines extending in a first direction from the axon circuits;
   m second direction lines intersecting the first direction lines;
   synapse circuits disposed at intersections of the first direction lines and the second direction lines, each of the synapse circuits being configured to:
     store a second input corresponding to a respectively different bit from among bits of an m-bit weight, and output an operation value of a corresponding first input and the second input; and
   neuron circuits connected to the first direction lines or the second direction lines, each of the neuron circuits being configured to:
     receive respective operation values output from at least one of the synapse circuits, based on time information assigned individually to the synapse circuits, and
     perform an arithmetic operation by using the respective operation values,
   wherein n and m are natural numbers, and at least one of n or m is greater than 1,
   wherein the neuron circuits collectively generate a multiplication result between the n-bit activation and the m-bit weight, and
   wherein at least some of the neuron circuits respectively include a different single adder, wherein each of the single adders is configured to calculate one of a plurality of bits the multiplication result by performing an addition operation: between a pre-set initial value and an operation value received from a synapse circuit; between the operation value, another operation value received from another synapse circuit, and a carry value received from another adder; or the carry value and one of the another operation value and an additional operation value received from an additional synapse circuit.

2. The neuromorphic processor of claim 1, wherein m is greater than 1.

3. The neuromorphic processor of claim 2, wherein n is greater than 1.

4. The neuromorphic processor of claim 1, wherein respective synapse circuits provided on a same line among the first direction lines are assigned with same time information, and respective synapse circuits provided on different lines among the first direction lines are assigned with different time information.

5. The neuromorphic processor of 1, wherein either one or both of an addition value and a carry value that are output from one of the single adders corresponds to one a bit of the multiplication result.

6. The neuromorphic processor of 1, wherein a time at which the each of the single adders performs the addition operation is determined based on time information corresponding to each of the corresponding respective operation values.

7. The neuromorphic processor of claim 1, wherein, for each of the synapse circuits, the respective operation values are obtained by AND operations of the corresponding first input and the second input.

8. The neuromorphic processor of claim 1, wherein each of the neuron circuits are configured to output a spike in response to a result value of the arithmetic operation being equal to or greater than a threshold value.

9. A method of operating a neuromorphic processor including a two-dimensional (2D) array having synapse circuits disposed at intersections of n first direction lines, respectively extending from n axon circuits in a first direction, and m second direction lines intersecting the first direction lines, and neuron circuits connected to the first direction lines or the second direction lines, the method comprising:
   receiving a first input corresponding to a respectively different bit from among bits of an n-bit activation, by each of the axon circuits;
   obtaining an operation value of a corresponding first input of the first inputs and a second input corresponding to a respectively different bit among bits of an m-bit weight, by each of the synapse circuits; and
   for each of the neuron circuits:

receiving respective operation values output from at least one of the synapse circuits, based on corresponding time information assigned individually to the synapse circuits; and performing an arithmetic operation based on the received respective operation values, wherein n and m are natural numbers, and at least one of n or m is greater than 1, wherein the neuron circuits collectively generate a multiplication result between the n-bit activation and the m-bit weight, wherein at least some of the neuron circuits respectively include a different single adder, and wherein the performing of the arithmetic operations comprise:

calculating, by each of the single adders, one of a plurality of bits of the multiplication result by adding: a pre-set initial value and an operation value received from a synapse circuit; the operation value, another operation value received from another synapse circuit, and a carry value received from another adder, or the carry value, one of the another operation value, and an additional operation value received from an additional synapse circuit.

10. The method of claim 9, wherein m is greater than 1.

11. The method of claim 10, wherein n is greater than 1.

12. The method of claim 9, further comprising:

assigning respective synapse circuits provided on a same line among the first direction lines with same time information; and assigning respective synapse circuits provided on different lines among the first direction lines with different time information.

13. The method of 9, further comprising determining either one or both of an addition value and a carry value that are output from one of the single adders to be a bit of the multiplication result.

14. The method of 9, further comprising determining a time at which each of the single adders perform the addition operation, based on time information corresponding to each of the operation values.

15. The method of claim 9, wherein, for each of the synapse circuits, the obtaining of the respective operation values is performed by performing AND operations of the corresponding first input and the second input.

16. The method of claim 9, further comprising each of the neuron circuits outputting a spike in response to a result value of the arithmetic operation being equal to or greater than a threshold value.

17. A non-transitory computer-readable storage medium storing instructions that, when executed by the neuromorphic processor or another processor, cause the neuromorphic processor to perform the method of claim 9.

18. The method of claim 9, further comprising:

for each the second direction lines, storing a corresponding second input provided by a corresponding second direction line in synapse circuits connected to the corresponding second direction line.

19. A two-dimensional (2D) array-based neuromorphic processor, comprising:

axon circuits, each of n axon circuits of the axon circuits being configured to receive a first input corresponding to a respectively differently bit from among bits of an n-bit activation;

n first direction lines extending in a first direction from the axon circuits;

m second direction lines intersecting the first direction lines;

synapse circuits disposed at intersections of the first direction lines and the second direction lines, each of the synapse circuits being configured to:

store a second input corresponding to a respectively different bit from among bits of an m-bit weight, and output an operation value of a corresponding first input and the second input; and neuron circuits connected to the first direction lines or the second direction lines, each of the neuron circuits being configured to:

receive respective operation values output from at least one of the synapse circuits, based on time information assigned individually to the synapse circuits, and perform an arithmetic operation by using the respective operation values, wherein n and m are natural numbers, and at least one of n or m is greater than 1, wherein the neuron circuits collectively generate a multiplication result between the n-bit activation and the m-bit weight, and wherein at least some of the neuron circuits are provided by a same single adder at different times, where the single adder is configured to:

calculate in a first time one of a plurality of bits of the multiplication result by performing an addition operation using, as an input, corresponding respective operation values received for the first time from at least one of the synapse circuits; and calculate in a subsequent time another one of the plurality of bits of the multiplication result by performing another addition operation using, as a corresponding input, corresponding respective operation values received at the subsequent time from at least another one of the synapse circuits.

20. The neuromorphic processor of claim 19, wherein the calculation in the first time performs the addition operation further using a set initial value or a carry value, and wherein the calculation in the subsequent time performs the other addition operation further using the carry value when the addition operation uses the set initial value, or further using another carry value generated by the adder in the first time when the addition operation uses the carry value.

21. A method of operating a neuromorphic processor including a two-dimensional (2D) array having synapse circuits disposed at intersections of n first direction lines, respectively extending from n axon circuits in a first direction, and m second direction lines intersecting the first direction lines, and neuron circuits connected to the first direction lines or the second direction lines, the method comprising:

receiving a first input corresponding to a respectively different bit from among bits of an n-bit activation, by each of the axon circuits;

obtaining an operation value of a corresponding first input of the first inputs and a second input corresponding to a respectively different bit among bits of an m-bit weight, by each of the synapse circuits; and for each of the neuron circuits:

receiving respective operation values output from at least one of the synapse circuits, based on corresponding time information assigned individually to the synapse circuits;

performing an arithmetic operation based on the received respective operation values, wherein n and m are natural numbers, and at least one of n or m is greater than 1, wherein the neuron circuits collectively generate a multiplication result between the n-bit activation and the m-bit weight, wherein at least some of the neuron circuits are provided by a same single adder at different times, and where the single adder performs:
- a calculating in a first time of one of a plurality of bits of the multiplication result based on corresponding respective operation values received for the first time from at least one of the synapse circuits; and
- a calculating in a subsequent time of another one of the plurality of bits of the multiplication result based on corresponding respective operation values received by the single adder at the subsequent time from at least another one of the synapse circuits.

* * * * *